(12) United States Patent
Glejbol

(10) Patent No.: US 9,482,373 B2
(45) Date of Patent: Nov. 1, 2016

(54) UNBONDED FLEXIBLE PIPE

(71) Applicant: National Oilwell Varco Denmark I/S, Brondby (DK)

(72) Inventor: Kristian Glejbol, Glostrup (DK)

(73) Assignee: NATIONAL OILWELL VARCO DENMARK I/S, Brondby (DK)

(*) Notice: Subject to any disclaimer, the term of this patent is extended or adjusted under 35 U.S.C. 154(b) by 88 days.

(21) Appl. No.: 14/412,506

(22) PCT Filed: Jun. 13, 2013

(86) PCT No.: PCT/DK2013/050195
§ 371 (c)(1),
(2) Date: Jan. 2, 2015

(87) PCT Pub. No.: WO2014/023311
PCT Pub. Date: Feb. 13, 2014

(65) Prior Publication Data
US 2016/0003382 A1    Jan. 7, 2016

(30) Foreign Application Priority Data
Jul. 6, 2012  (DK) .................................. 2012 70409

(51) Int. Cl.
*F16L 11/00* (2006.01)
*F16L 11/20* (2006.01)
(Continued)

(52) U.S. Cl.
CPC ................ *F16L 11/20* (2013.01); *F16L 11/02* (2013.01); *F16L 11/082* (2013.01); *F16L 11/14* (2013.01)

(58) Field of Classification Search
CPC .......... F16L 11/083; F16L 11/16; F16L 11/10
USPC ........................ 138/134, 135, 137, 133, 138
See application file for complete search history.

(56) References Cited

U.S. PATENT DOCUMENTS 6,039,083 A    3/2000 Loper
6,363,974 B1   4/2002 Perez et al.
(Continued)

FOREIGN PATENT DOCUMENTS

EP    1 119 684 B1    7/2003
FR    20858841 A1     2/2005
(Continued)

OTHER PUBLICATIONS

Application No. DK PA 2012 00185; Dated Mar. 13, 2012; Which Corresponds with International Application No. PCT/DK2013/050063.
(Continued)

*Primary Examiner* — Patrick F Brinson
(74) *Attorney, Agent, or Firm* — Pearne & Gordon LLP

(57) ABSTRACT

The invention relates to an unbonded flexible pipe with a length and a longitudinal axis. The pipe comprises an inner sealing sheath defining a bore, a pressure armor layer, an intermediate sealing sheath and a tensile armor. The pressure armor layer comprises at least one elongate metal element arranged with pressure armor gaps and is arranged in an annulus provided between the inner sealing sheath and the intermediate sealing sheath. The tensile armor is arranged on the outer side of the intermediate sealing sheath. Either the intermediate sealing sheath forms a drainage layer or the unbonded flexible pipe further comprises a drainage layer arranged in the annulus. The drainage layer comprises at least one drainage path arranged along the length of the pipe, wherein the drainage path is in fluid communication with the pressure armor gaps. The drainage layer optionally comprises a perforated tube.

23 Claims, 13 Drawing Sheets

(51) Int. Cl.
*F16L 11/08* (2006.01)
*F16L 11/02* (2006.01)
*F16L 11/14* (2006.01)

(56) References Cited

U.S. PATENT DOCUMENTS

| | | | |
|---|---|---|---|
| 6,634,387 B1 | 10/2003 | Glejbøl | |
| 6,691,743 B2 * | 2/2004 | Espinasse | F16L 11/16 138/127 |
| 6,769,454 B2 | 8/2004 | Fraser et al. | |
| 6,843,278 B2 * | 1/2005 | Espinasse | F16L 11/16 138/127 |
| 6,966,344 B2 * | 11/2005 | Coutarel | F16L 11/16 138/129 |
| 6,978,806 B2 | 12/2005 | Glejbol et al. | |
| 7,124,780 B2 | 10/2006 | Dupoiron | |
| 7,976,920 B2 | 7/2011 | Braad et al. | |
| 8,163,364 B2 | 4/2012 | Braad et al. | |
| 8,960,239 B2 * | 2/2015 | Glejbol | 138/134 |
| 2003/0056845 A1 | 3/2003 | Fraser et al. | |
| 2004/0256019 A1 | 12/2004 | Marion | |
| 2006/0090808 A1 | 5/2006 | Dupoiron | |
| 2006/0191587 A1 | 8/2006 | Gerez | |
| 2008/0145583 A1 | 6/2008 | Bryant | |
| 2010/0062202 A1 | 3/2010 | Procida | |
| 2013/0340877 A1 | 12/2013 | Kassow et al. | |

FOREIGN PATENT DOCUMENTS

| | | |
|---|---|---|
| WO | 2004/040183 A1 | 5/2004 |
| WO | 2008/053142 A2 | 5/2008 |
| WO | 2008/077409 A1 | 7/2008 |
| WO | 2008/113362 A1 | 9/2008 |
| WO | 2009/024156 A2 | 2/2009 |
| WO | 2011/072688 A1 | 6/2011 |
| WO | 2012/092931 A1 | 7/2012 |
| WO | 2012/097823 A1 | 7/2012 |

OTHER PUBLICATIONS

"Recommended Practice for Flexible Pipe", ANSI/API Recommended Practice; 17B, Fourth Edition, Jul. 2008; pp. 1-213.
"Specification for Unbonded Flexible Pipe"; ANSI/API Specification 17J; Third Edition, Jul. 2008; pp. 1-73.
Supplementary European Search Report for 13 82 8531 dated Jan. 7, 2016.

* cited by examiner

UNBONDED FLEXIBLE PIPE

TECHNICAL FIELD

The invention relates to an unbonded flexible pipe in particular for offshore and subsea transportation of fluids like hydrocarbons, CO2, water and mixtures hereof.

BACKGROUND ART

Flexible unbonded pipes of the present type are for example described in the standard "Recommended Practice for Flexible Pipe", ANSI/API 17 B, fourth Edition, July 2008, and the standard "Specification for Unbonded Flexible Pipe", ANSI/API 17J, Third edition, July 2008. Such pipes usually comprise an inner liner also often called an inner sealing sheath or an inner sheath, which is the innermost sealing sheath and which forms a barrier against the outflow of the fluid which is conveyed in the bore of the pipe, and one or more armoring layers. Often the pipe further comprises an outer protection layer which provides mechanical protection of the armor layers. The outer protection layer may be a sealing layer sealing against ingress of sea water. In certain unbonded flexible pipes one or more intermediate sealing layers are arranged between armor layers.

In general flexible pipes are expected to have a lifetime of 20 years in operation.

Examples of unbonded flexible pipes are e.g. disclosed in U.S. Pat. No. 6,978,806; U.S. Pat. No. 7,124,780; U.S. Pat. No. 6,769,454 and U.S. Pat. No. 6,363,974.

The term "unbonded" means in this text that at least two of the layers including the armoring layers and polymer layers are not bonded to each other. In practice the known pipe normally comprises at least two armoring layers located outside the inner sealing sheath and optionally an armor structure located inside the inner sealing sheath normally referred to as a carcass.

The term "sealing sheath" is herein used to designate a liquid impermeable layer, normally comprising or consisting of polymer. The term "inner sealing sheath" designates the innermost sealing sheath. The term "intermediate sealing sheath" means a sealing sheath which is not the inner sealing sheath and which comprises at least one additional layer on its outer side. The term "outer sealing sheath" means the outermost sealing sheath.

The armoring layers usually comprise or consist of one or more helically wound elongated armoring elements, where the individual armor layers are not bonded to each other directly or indirectly via other layers along the pipe. Thereby the pipe becomes bendable and sufficiently flexible to roll up for transportation.

For many applications a pipe of the above type will need to fulfill a number of requirements. First of all the pipe should have a high mechanical strength to withstand the forces it will be subjected to during transportation, deployment and operation. The internal pressure (from inside of the pipe and outwards) and the external pressure (from outside of the pipe) are usually very high and may vary. The unbonded flexible pipes are therefore usually armored with at least one pressure armor layer composed of helically wound steel elements which are wound with a relatively high winding angle to the axis of the pipe. It is well known that such pressure armor steel elements require protection from contact with seawater and therefore the pressure armor steel elements are usually applied in an annulus between the inner sealing sheath and a sealing sheath most often together with one or more tensile armor layers comprising elongate armor elements wound with a relatively low winding angle to the axis of the pipe.

In order to reduce the risk of damaging the pipe due to increased pressure in the annulus caused by gasses, such as $CO_2$, $H_2S$ and $H_2O$, which diffuse through the inner sealing sheath from the bore of the pipe, the annulus often comprises a means for venting such annulus normally through passages between the tensile armor elements. Another purpose of draining gasses diffused through the inner sealing sheath is that such gas often comprises highly corrosive components originating from the fluid transported in the bore of the pipe, such as $H_2S$.

However, in some situations the pressure armor layer or layers and the tensile armor layer or layers are separated by a sealing sheath and in such cases it has shown to be difficult to provide a sufficient and safe draining of undesired gas from the annulus comprising the pressure layer(s), in particular because such pressure armor elements generally need to be very closely packed and are often interlocked in order to provide a sufficient protection against burst and damage due to high internal pressure in the pipe.

U.S. Pat. No. 7,124,780 describes a flexible tubular pipe having from internal and out an inner sealing sheath, a pressure armor, an intermediate sealing sheath, at least one tensile armor layer and an outer sealing sheath. The annulus formed by the inner annular space between the inner sealing sheath and the intermediate sealing sheath comprises a drainage layer which is used to drain the gases present in the annular space, wherein the drainage layer is formed by a short-pitch winding of at least one long element having transverse drain holes or spaces which can drain gases between the successive turns of the winding.

U.S. Pat. No. 6,769,454 describes a flexible pipe comprising an inner sealing sheath defining an inner longitudinal passage and at least one longitudinally extending tube embedded in the inner sealing sheath and extending for the length of the inner sealing sheath. The tube is adapted to receive any gases permeating through or into the inner layer and to vent gases from the pipe. The pipe further comprises an outer sealing sheath extending over the inner sealing sheath.

The above solutions may help in removing undesired gasses from the annulus. However, the solution provided simultaneously results in an undesired weakening of the pipe. Replacing parts of the armor layer with drainage means inevitably reduces the strength of the pipe. Further it should be mentioned that the intactness of the inner sealing sheath is very important for the strength of the pipe against leaks.

DISCLOSURE OF INVENTION

The object of the present invention is to provide an unbonded flexible pipe comprising from inside (the bore) and out an inner sealing sheath, a pressure armor layer, a sealing sheath and at least one tensile armor layer, and where gas diffused through the inner sealing sheath from the bore can be removed in a simple and effective way without resulting in an undesired weakening of the pipe.

These and other objects have been solved by the invention as defined in the claims and as described herein below.

It has been found that the invention and embodiments thereof have a number of additional advantages which will be clear to the skilled person from the following description.

The unbonded flexible pipe of the invention has a length which is usually about 50 m or longer, such as up to about 2 or 3 kilometers or even longer. The unbonded flexible pipe of the invention has a longitudinal axis (sometimes also called the centre axis), which is the central axis of the bore. Usually the bore will be substantially circular in cross-section, but it may also have other shapes, such as oval. All angles and directions determined with respect to the longitudinal axis are determined when the pipe is in straight position.

The unbonded flexible pipe of the invention comprises an inner sealing sheath defining a bore, a pressure armor layer, an intermediate sealing sheath and a tensile armor. The pressure armor layer comprises at least one elongate metal element arranged with pressure armor gaps and is arranged in an annulus provided between the inner sealing sheath and the intermediate sealing sheath. The tensile armor is arranged on the outer side of the intermediate sealing sheath. The intermediate sealing sheath forms a drainage layer or the unbonded flexible pipe further comprises a drainage layer arranged in the annulus. The drainage layer comprises at least one drainage path arranged along the length of the pipe, wherein the drainage path is in fluid communication with the pressure armor gaps.

By providing the unbonded flexible pipe with a drainage layer with a drainage path arranged along the length of the pipe the above object has been solved in a simple and cost effective way without causing any weakening of the pressure armor. According to the invention the drainage layer comprises at least one drainage path in fluid communication with the pressure armor gaps, such that gas can be drained from the annulus via the drainage path.

In an embodiment of the invention the pressure armor layer comprises or consists of one single elongate metal wire which is helically wound and preferably interlocked with itself in adjacent windings.

In an embodiment of the invention the pressure armor layer comprises or consists of two or more elongate metal wires which are helically wound and preferably interlocked in adjacent windings.

Structures of pressure armor layers including interlocked pressure armor layers are well known in the art see e.g. "Recommended Practice for Flexible Pipe", ANSI/API 17 B, fourth Edition, July 2008, and the standard "Specification for Unbonded Flexible Pipe", ANSI/API 17J, Third edition, July 2008 as well as U.S. Pat. No. 6,978,806. A preferred pressure armor layer structure is as described in any of WO2008/077409, WO2009/024156 and WO2012DK050021.

In order for the unbonded flexible pipe to have a desired flexibility the pressure armor layer comprises gaps referred to as pressure armor layer gaps between windings of the at least one elongate metal element. The gaps can be in the form of actual distances between windings or the gaps can be provided by plays between interlocked adjacent windings, i.e. adjacent windings can move laterally with respect to each other a certain distance. This distance is called the play.

In an embodiment the pressure armor layer is an interlocked layer. The interlocking of the pressure armor layer provides the unbonded flexible pipe with an increased strength against burst, because the interlocking limits the maximal gap (play) between adjacent windings.

As mentioned above the pressure armor layer is in general highly closely packed in order to provide a sufficient protection against burst and damage due to high internal pressure in the pipe.

The at least one elongate metal wire is normally wound with a winding angle to the longitudinal axis of the core part of the pipe which is at least about 55 degrees in order to provide significant pressure force. In preferred embodiments the at least one elongate metal wire is wound with significantly higher winding angles, e.g. at least about 70 degrees.

In an embodiment the pressure armor layer comprises at least one elongate metal wire which is helically wound and optionally interlocked in adjacent windings and the at least one elongate metal wire is wound with a winding angle to the longitudinal axis of the core part of the pipe which is at least about 75 degrees, such as at least about 80 degrees, such as about 85 degrees or higher.

The drainage path is preferably leading to an exit site where the gasses can exit the annulus. Such exit site can advantageously be arranged in an end fitting connected to the unbonded flexible pipe, but in principle the exit site can be provided anywhere along the length of the unbonded flexible pipe. Usually the exit site will be provided with a one-way valve or a pressure relief valve or similar means to regulate the flow of gasses via the exit site.

In one embodiment a pump is provided to pump applied to withdraw gasses from the annulus via the exit site.

Optionally the drainage path comprises two exit sites and a maintaining fluid can be applied to pass through the annulus to absorb and/or remove undesired gasses there from.

It should be understood that the drainage path(s) can be applied for ventilation/removal and/or flushing of gasses from the annulus. In an embodiment the drainage path(s) is configured for being flushed using a maintaining medium which is flushed through the annulus.

The term "in radial direction" means a direction from the axis of the pipe and radially outwards.

The terms "inside" and "outside" a layer of the pipe are used to designate the relative distance to the axis of the pipe, such that "inside a layer" means the area encircled by the layer i.e. with a shorter axial distance than the layer, and "outside a layer" means the area not encircled by the layer and not contained by the layer, i.e. with a shorter axial distance than the layer.

The term "inner side" of a layer is the side of the layer facing the axis of the pipe. The term "outer side" of a layer is the side of the layer facing away from the axis of the pipe.

The term "inwards" means in a direction towards the longitudinal axis and the term "outwards" means in a direction away from the longitudinal axis of the pipe The term "essentially smooth" means herein substantially free of cavities and protrusions which are visible by the average eye.

The term 'riser' is herein used to designate a transportation line with a generally vertical orientation e.g. a pipe riser for transportation of fluid or a cable riser for transportation of electricity, signals and similar. An umbilical is usually a riser of the cable comprising several elements i.e. of cable type riser and/or pipe type riser.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

The term "substantially" is herein used to indicate that what is within ordinary production tolerances and production variances are included.

The intermediate sealing sheath primarily has the purpose of protecting the pressure armor layer against sea water in order to avoid undesired corrosion. This protection also may entail that a less costly metal alloy can be applied for the elongate metal wire(s) of the pressure armor layer.

In an embodiment the intermediate sealing sheath additionally forms the drainage layer. In this embodiment the intermediate sheath comprises at least one groove shaped channel on the inner side thereof facing the pressure armor layer and the groove shaped channel forms the drainage path or a perforated tube arranged in the groove shaped channel forms the drainage path.

Since the intermediate sealing sheath is not subjected to excessive pressure from the fluid transported in the bore, the strength of the intermediate sealing sheath need not be very high, and if the risk of building up a high pressure in the annulus simultaneously is reduced due to the drainage layer, a formation of a groove shaped channel on the inner side of the intermediate sealing sheath does not result in any significant reduction of the strength of the pipe, but may in fact increase the pipe strength.

Suitable size and shape of the groove shaped channel and/or the tube depend on the pressure in the bore and the dept of the sea the pipe is intended for use and may for example be as described below.

In this embodiment where the drainage layer is provided by the intermediate sealing sheath, the annulus between the inner sealing sheath and the intermediate sealing sheath preferably comprises only the pressure armor layer and an optionally perforated tube forming the drainage path as well as optionally other small elements that can be provided in the drainage path without blocking the drainage therein.

In an embodiment the drainage layer is not the intermediate sealing sheath, but is an additional layer arranged in the annulus. In this embodiment the drainage layer comprises at least one drainage path and a polymer panel structure framing the at least one drainage path. The polymer panel structure is provided in order to ensure a sufficiently smooth surface for the layer applied upon the drainage layer and simultaneously the polymer panel structure ensures that the drainage path is maintained intact even when the unbonded flexible pipe is in use under relatively high internal and/or external pressure.

In an embodiment the drainage path is provided simply by groove shaped channel(s) provided in the polymer panel structure.

In an embodiment the drainage path is provided by gaps between sections of the polymer panel structure. The gaps can be adjusted by distance elements which are arranged such that they do not block the draining through the drainage path.

In an embodiment the drainage path is in the form of a perforated tube, preferably comprising a plurality of perforations.

The perforations of perforated tube should preferably have sufficient size and be provided in a sufficient number to ensure a suitable drainage of the annulus. The skilled person can by a few tests find a suitably perforated tube for a given unbonded flexible pipe designed for a certain use. The use of a perforated tube for providing the drainage path ensures a high stability of the drainage path. The perforated tube can for example be provided of polymer and/or metal.

In an embodiment the perforated tube comprises a plurality of perforations arranged such that they are facing towards the pressure armor layer.

In an embodiment the polymer panel structure or the intermediate sealing sheath and the perforated tube are not bonded to each other. In this embodiment the perforations of the perforated tube need not face towards the pressure layer, however, for optimal draining it is desired that at least some of the perforation are facing towards the pressure armor layer.

In an embodiment where the drainage layer comprises the polymer panel structure, it is desired that the polymer panel structure does not extend essentially in radial direction inside and/or in radial direction outside the perforated tube. At least the perforated tube should not be fully embedded in the polymer panel structure.

In an embodiment the perforated tube is partly embedded in the polymer panel structure, such that passages are provided between perforations of the perforated tube and the gaps of the pressure armor layer.

In an embodiment where the drainage layer comprises the polymer panel structure, it is desired that the polymer panel structure provides a grove shaped crib for the perforated tube. The grove shaped crib is preferably such that the tube is facing towards the pressure armor layer. Preferably the perforated tube is fully contained in the grove shaped crib. In that way the gasses can escape from the annulus via the perforations in the perforated tube and along the drainage path to an exit site where it is fully withdrawn from the annulus.

In an embodiment where the drainage layer comprises the polymer panel structure, it is desired that the panel structure extends partially in radial direction inside and/or the panel structure extends partially in radial direction outside the perforated tube. In a preferred embodiment the drainage layer is arranged outside the pressure armor layer and the polymer panel structure extends partially and not fully in radial direction inside the perforated tube such that the part of the perforated tube facing inwards is not fully covered by the panel structure. In a preferred embodiment the drainage layer is arranged inside the pressure armor layer and the panel structure extends partially and not fully in radial direction outside the perforated tube such that the part of the perforated tube facing outwards is not fully covered by the panel structure. Preferably the part of the perforated tube that is not fully covered comprises a plurality of the perforations.

The drainage layer can in principle have any thickness sufficient to provide the drainage path. In situations where the intermediate sealing sheath provides the drainage layer, the drainage layer should have a thickness which is sufficient to provide the drainage path and simultaneously provide the desired sealing against ingress of sea water. In the situation where the drainage layer is an additional layer comprising a polymer panel structure, the thickness of the drainage layer and thereby the polymer panel structure should preferably be at least the radial extension (e.g. outer radial diameter) of the drainage path, such that the drainage path e.g. in the form of a perforated tube does not protrude radially outside or inside the drainage layer.

In an embodiment comprising a perforated tube, the perforated tube has an outer radial diameter determined in radial direction and the drainage layer has a thickness determined in radial direction, wherein the thickness of the drainage layer is up to about 5 times, such as up to about 4 times, such as up to about 3 times, such as up to about 2 times, such as up to about 1.5 times the outer radial diameter of the perforated tube.

In an embodiment the perforated tube has an outer radial diameter determined in radial direction and the drainage layer has a thickness determined in radial direction, wherein the thickness of the drainage layer is at least about 1.1 times, such as at least about 1.5 times, such as at least about 2 times the outer radial diameter of the perforated tube. In this embodiment it is desired that the panel structure provides a grove shaped crib for the perforated tube, such that the tube is facing towards the pressure armor layer.

In an embodiment comprising a perforated tube, the perforated tube has an outer radial diameter determined in radial direction and the drainage layer has a thickness determined in radial direction, wherein the thickness of the drainage layer is at least about 75% the outer radial diameter of the perforated tube, such as at least about 80%, such as at least about 85%, such as at least about 90%, such as at least about 95%, preferably the thickness of the drainage layer is substantially equal to the outer radial diameter of the perforated tube.

In an embodiment where the drainage layer comprises a polymer panel structure, the polymer panel structure simultaneously forms a thermal insulation layer. In this embodiment the polymer panel structure is preferably provided by a material having a relatively thermal conductivity. Preferably the polymer panel structure exhibits a thermal conductivity of about 0.3 W/m·K or less, such as about 0.25 W/m·K or less, such as about 0.2 W/m·K or less such as about 0.15 W/m·K or less. Suitable materials are known by the skilled person. Preferred materials are disclosed below.

The drainage layer of the unbonded flexible pipe advantageously comprises a plurality of perforated tubes, such as at least 2, such as at least 4 perforated tubes. The tubes may be arranged with any configuration preferably with due deference to maintaining the flexibility of the pipe.

In an embodiment the drainage path is arranged to be substantially parallel with the longitudinal axis of the pipe. This embodiment is in particular advantageous in situations where the drainage path is provided by the groove shaped channel alone or in situations where the drainage path is in the form of a perforated tube, where the perforated tube is of a very flexible material, such as an elastomeric polymer e.g. rubber.

In an embodiment the drainage path is arranged to extend helically along the length of the pipe. Thereby the drainage path can be provided by any means without resulting in any reduction of the flexibility of the unbonded flexible pipe. To provide a fast and effective draining via the drainage path it is generally desired that the drainage path has a relatively low helical configuration relative to the longitudinally axis of the pipe, since this will result in a relatively short travelling distance to reach the exit site where the gas exits from the annulus. In an embodiment the drainage path has a helical configuration with a helical angle of about 60 degrees or less to the longitudinal axis of the pipe, such as with a helical angle of about 55 degrees or less, such as with a helical angle of about 50 degrees or less, such as with a helical angle of about 45 degrees or less, such as with a helical angle of about 40 degrees or less.

In an embodiment the drainage path is arranged to extend with rounded or angular wave-shapes, generally referred to as an S-configuration or a Z-configuration, along the length of the pipe. Thereby the drainage path is arranged in a non-straight configuration while simultaneously keeping the travelling distance to reach the exit site relatively low.

The drainage layer of the unbonded flexible pipe advantageously comprises a plurality of drainage paths with or without perforated tubes. In an embodiment the plurality of drainage paths are crossing each other. In an embodiment the plurality of drainage paths are applied in parallel e.g. equidistantly to each other.

The plurality of drainage paths can be equal or different in shape and/or size.

In an embodiment the plurality of drainage paths are substantially equal in shape and size along their length.

In an embodiment the drainage layer comprising at least one drainage path, the drainage path has a cross-sectional area which is substantially identical along its length.

In an embodiment the drainage layer comprising at least one drainage path, the drainage path leads to the exit site where the gas can exit from the annulus, preferably the drainage path has a cross-sectional area which is larger in a length section close to the exit site than in a length section farther from the exit site.

In an embodiment the drainage layer comprises a signal transmitting element in form of an electrical conductor.

In the embodiment comprising a polymer panel structure, the polymer panel structure can in principle be provided by any method. The polymer panel structure is in an embodiment folded onto the pipe, wound onto the pipe or applied in a plurality of panel sections.

In an embodiment the polymer panel structure is extruded onto the pipe. Optionally groove shaped channel(s) is/are provided in the extrusion process.

The polymer panel structure may advantageously have a relatively high stiffness to ensure that it can withstand compressive forces without damaging the drainage path. In an embodiment the polymer panel structure is of a material having an elastic modulus $E \geq 1.5$ GPa, such as an elastic modulus $E \geq 2$ GPa.

In an embodiment the polymer panel structure has a compression stiffness in axial direction of the pipe of at least about 1 GPa/m.

The polymer panel structure preferably comprises at least about 75% by mass of polymer, such as at least about 80% by mass of polymer, such as at least about 85% by mass of polymer, such as at least about 90% by mass of polymer, such as at least about 95% by mass of polymer. The remaining parts are preferably filler(s) and/or reinforcement(s).

In order for the polymer panel structure to have a high stability it is generally desired that the polymer panel structure is unfoamed.

Examples of suitable materials for the polymer panel structure comprise a homopolymer or a copolymer comprising at least one of the materials in the group comprising polyolefins, e.g. polyethylene or polypropylene (PP), such as stiff linear copolymer PP with a branched homopolymer PP; polyoxyethylenes (POE); cycloolefin copolymers (COC); polyamides (PA), e.g. polyamide-imide, polyamide-11 (PA-11), polyamide-12 (PA-12) or polyamide-6 (PA-6)); polyimide (PI); polyurethanes such as polyurethane-isocyanurate; polyureas; polyesters; polyacetals; polyethers such as polyether sulphone (PES); polyoxides; polysulfides, such as polyphenylene sulphide (PPS); thermoplastic elastomers, such as styrene block copolymers, such as poly(styrene-block-butadiene-block-styrene) (SBS) or their selectively hydrogenated versions SEBS and SEPS; termoplastic polyolefins (TPO) e.g. comprising SEBS and/or SEPS; polysulphones, e.g. polyarylsulphone (PAS); polyacrylates; polyethylene terephthalates (PET); polyether-ether-ketones (PEEK); polyvinyls; polyacrylonitriles (PAN); polyetherketoneketone (PEKK); and/or copolymers of the preceding; fluorous polymers e.g. polyvinylidene difluoride (PVDF), homopolymers or copolymers of vinylidene fluoride ("VF2"), homopolymers or copolymers of trifluoroethylene ("VF3"), copolymers or terpolymers comprising two or more different members selected from VF2, VF3, chlorotrifluoroethylene, tetrafluoroethylene, hexafluoropropene, or hexafluoroethylene.

In an embodiment the polymer panel structure comprises reinforcement element(s) such as fibers, solid and/or hollow microspheres, e.g. made from glass, polymer or silica, preferably the polymer panel structure comprises fibres, such as glass fibres, carbon fibres, aramide fibres, silica fibres such as basalt fibres, steel fibres, polyethylene fibres, polypropylene fibres, mineral fibres, and/or any combination thereof.

In an embodiment the polymer panel structure comprises syntactic foam.

In an embodiment the drainage layer is arranged above the pressure armor layer.

In an embodiment the drainage layer is arranged below the pressure armor layer.

In situations where the unbonded flexible pipe is adapted for use at relatively deep water, it is generally desired that the unbonded flexible pipe comprises a carcass arranged inside the inner sealing sheath. The carcass may have any shape such as it is generally known in the art.

The tensile armor arranged on the outer side of the intermediate sealing sheath is preferably made from or comprises a plurality of helically wound elongate armor elements, preferably wound with a winding angle relative to the longitudinal axis of up to about 55 degrees, such as from about 30 degrees to about 50 degrees. The tensile armor preferably comprises at least two cross-wound tensile armor layers, each tensile armor layer comprising a plurality of helically wound elongate armor elements. The tensile armor is preferably provided by a material with a high tolerance towards sea water. The tensile armor (also referred as traction reinforcement) can for example be as the traction reinforcement described in U.S. Pat. No. 6,978,806. In a preferred embodiment the tensile armor layer comprises a plurality of helically wound elongate armor elements as the elongate armor elements described in DK PA 2012 00185.

The tensile armor preferably comprises or consists essentially of composite material, more preferably the tensile armor comprises or consists essentially of helically wound elongate composite armor elements.

The term "composite material" is herein used to designate a solid material which is composed of two or more substances having different physical characteristics and in which each substance retains its identity while contributing desirable properties to the whole. The composite material is preferably in the form of a polymer or polymer mixture comprising reinforcement material such as fibers embedded therein e.g. by pultrusion.

In an embodiment the unbonded flexible pipe comprises an outer sealing sheath arranged outside the tensile armor. However, in a preferred embodiment the unbonded flexible pipe comprises an outer sealing sheath arranged outside the tensile armor. In this latter embodiment the unbonded flexible pipe advantageously comprises an outer liquid permeable protection layer e.g. as described in U.S. Pat. No. 6,978,806.

The unbonded flexible pipe may comprise additional layer(s), such as additional insulation layer(s), anti wear layers arranged above and/or below armor layers and similar such as it is known in the art and e.g. as disclosed in "Recommended Practice for Flexible Pipe", ANSI/API 17 B, fourth Edition, July 2008, and the standard "Specification for Unbonded Flexible Pipe", ANSI/API 17J, Third edition, July 2008.

The unbonded flexible pipe is preferably suitable for subsea fluid transportation in particular for deep water applications and for transportation of water or aggressive fluids, such a petrochemical products, e.g. from a production well to a sea surface installation.

In a preferred embodiment the unbonded flexible pipe is a riser pipe, such as a riser suitable for subsea fluid transportation of fluids such as petrochemical products, e.g. from a subsea facility e.g. a production well to an upper facility e.g. a sea surface installation.

All features of the inventions including ranges and preferred ranges can be combined in various ways within the scope of the invention, unless there are specific reasons not to combine such features.

BRIEF DESCRIPTION OF DRAWINGS

The invention will be explained more fully below in connection with a preferred embodiment and with reference to the drawings in which.

Figure 1:
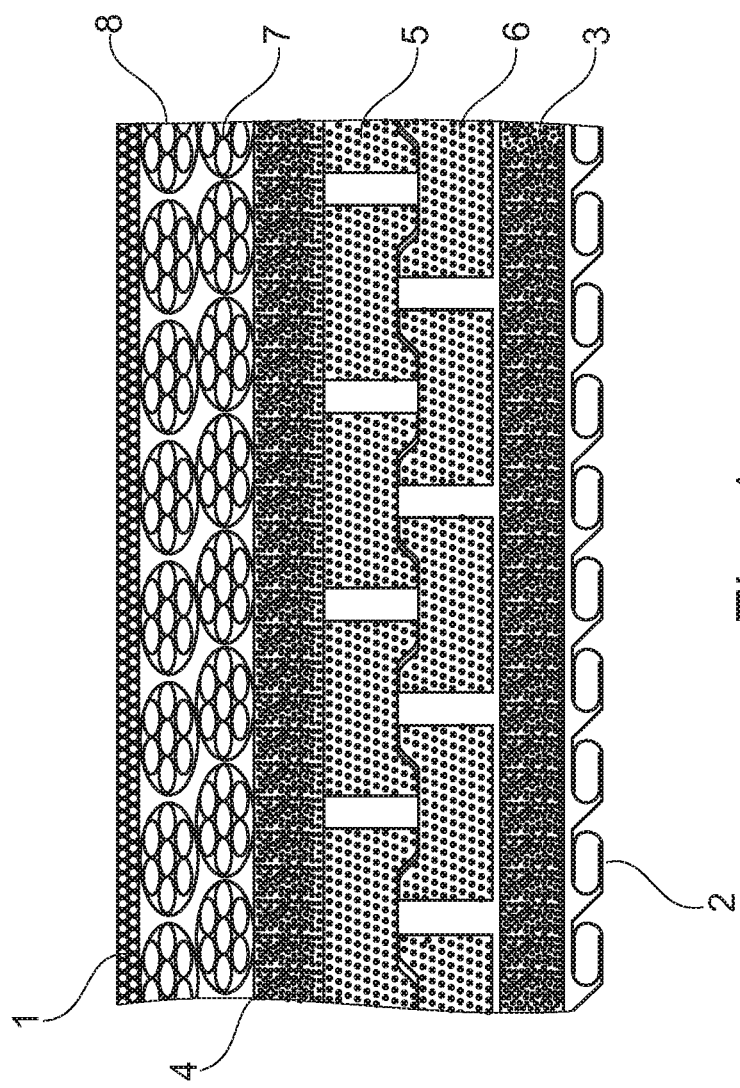
FIG. 1 is a schematic illustration of a wall section of a prior art pipe.

The prior art pipe shown in FIG. 1 is as the pipe disclosed in U.S. Pat. No. 6,978,806 and comprises an inner sealing sheath 3 which surrounds a carcass 2, which has the purpose of providing the pipe with resistance against collapse of the inner sealing sheath 3, if the pressure difference between its outer and inner side exceeds a pressure level which the inner sealing sheath 3 itself can tolerate.

The carcass 2 is a traditional carcass consisting of a metal band which is wound in a helical manner so that it forms an inner structure of the pipe. Outside the inner sealing sheath 3, the pipe comprises a pressure armor layer 5, 6 of interlocked elongate armor elements (reinforcement profiles) 5, 6. Outside the pressure armor layer the pipe comprises an intermediate sealing sheath 4, such that an annulus is provided between the inner sealing sheath 3 and the intermediate sealing sheath 4 and the pressure armor layer is arranged in the annulus. Outside the intermediate sealing sheath the pipe comprises a pair of tensile armor layers 7, 8 of fibre-reinforced polymers or alloys based on titanium. Outermost the pipe comprises a liquid permeable protection layer 1, e.g. produced from an extruded thermoplastic material which is perforated either during or after the extrusion or the liquid permeable protection layer is a wound layer made of aramide strips embedded in a thermoplastic matrix.

It is mentioned that the annulus between the inner sealing sheath 3 and the intermediate sealing sheath 4 can be arranged to be ventilated or flushed through with a cleaning liquid. However, as explained above such ventilation or flushing has shown to be difficult or even impossible due to the compactness of the pressure armor layer.

Figure 2:
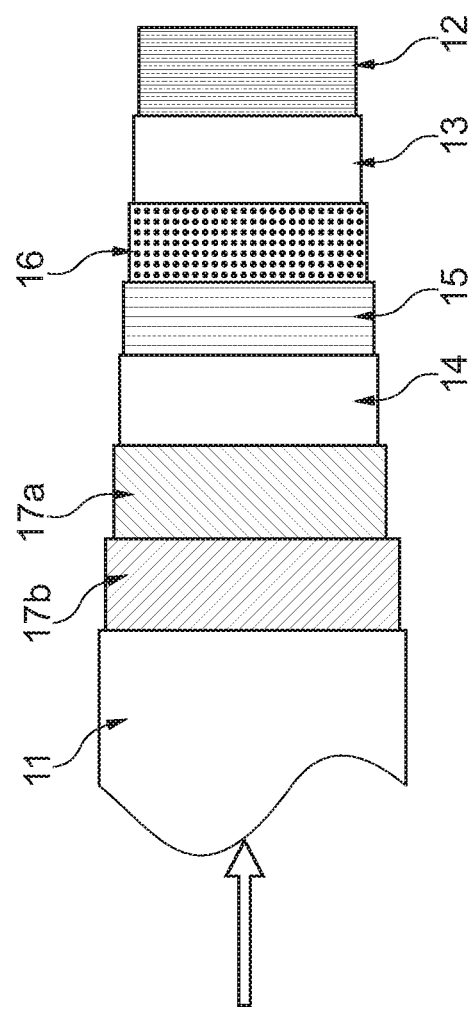
FIG. 2 is a schematic side view of a flexible pipe of the invention.

The flexible pipe of the present invention as shown in FIG. 2 comprises an inner sealing sheath 13, sometimes also called an inner liner, e.g. of high density poly ethylene (HDPE) cross linked polyethylene (PEX), Polyvinyldifluorid (PVDF) or polyamide (PA). As explained above, the inner sealing sheath 13 has the purpose of preventing outflow of the fluid transferred in the bore of the pipe, indicated with the bold arrow. In practice the inner sealing sheath 13 will not fully ensure prevention of outflow of the fluid transported, since gasses will permeate through the inner sealing sheath 13. Inside the inner sealing sheath 13 the pipe comprises an inner armor layer 12, called a carcass which is normally of metal, and has the main purpose of reinforcing the pipe against collapse. The carcass 12 is not liquid tight. On the outer side of the inner sealing sheath 13, the unbonded flexible pipe comprises a drainage layer 16 and outside the drainage layer the pipe comprises a pressure armor layer 15 which is of helically wound elongate armor element(s) of metal, which is wound with a relatively high angle to the longitudinal axis of the pipe as explained above, such as about 65 degrees or more e.g. about 85 degrees. The pressure armor layer 15 is not liquid tight, but comprises not shown pressure armor gaps between windings as explained above. The drainage layer 16 comprises at least one not shown drainage path in fluid communication with the pressure armor gaps and arranged along the length of the pipe.

Outside the pressure armor layer 15, the unbonded flexible pipe of FIG. 2 comprises an intermediate sealing sheath 14, such that an annulus is formed between the inner sealing sheath 13 and the intermediate sealing sheath 14 and such that the pressure armor layer 15 and the drainage layer 16 are arranged in the annulus.

Two cross wound tensile armor layers 17a, 17b wound from elongate armoring elements are arranged outside the intermediate sealing sheath 14. The elongate armoring element of the innermost tensile armor layer 17a is for example wound with a winding degree of about 50 degrees or less relative to the longitudinal axis of the pipe in a first winding direction and the outermost tensile armor layer 17b is for example wound with a winding degree of up to about 55 degrees relative to the longitudinal axis in a second winding direction which is the opposite direction to the first winding direction. Such two armor layers with such opposite winding directions are normally referred to as being cross wound.

The pipe further comprises an outermost protecting sheath 11, which can be an outer sealing sheath (i.e. a liquid impervious sheath), but is preferably liquid permeable. Where the protecting sheath 11 is liquid impervious a second annulus is formed between this liquid impervious outermost protecting sheath 11 and the intermediate sealing sheath 14, and this second annulus is preferably arranged to be ventilated or flushed through with a cleaning liquid e.g. as described in EP 1 119 684, WO 2008/053142 or WO2012DK50002.

However, as mentioned it is generally preferred that the outermost protecting sheath 11 is liquid pervious and that the tensile armor is of a material which can tolerate contact with sea water as described above.

The unbonded flexible pipe can advantageously comprise not shown anti-wear layers on either sides of the two cross wound tensile armor layers 17a, 17b and between the pressure armor layer 15 and the intermediate sealing sheath 14.

Figure 3:
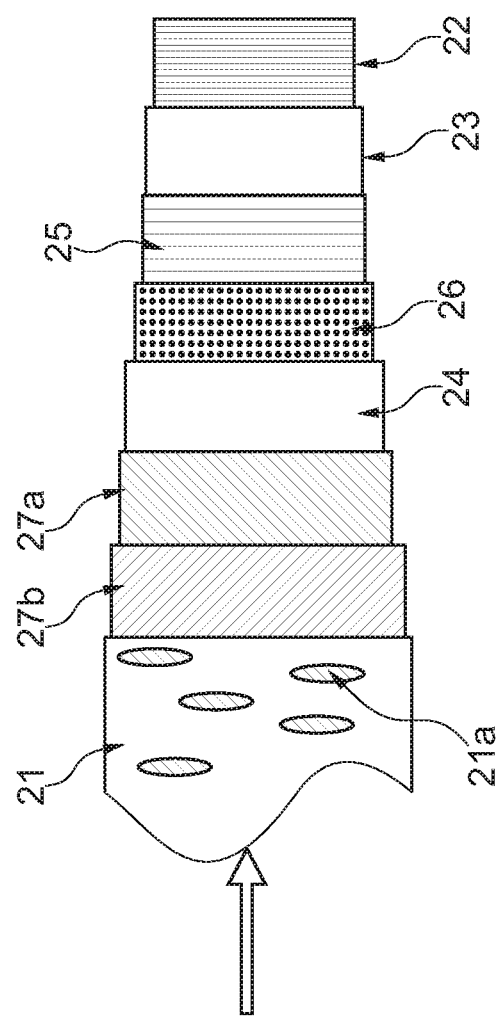
FIG. 3 is a schematic side view of another flexible pipe of the invention.

The unbonded flexible pipe of the invention shown in FIG. 3 comprises from inside and out a carcass 22, an inner sealing sheath 23, a pressure armor layer 25, a drainage layer 26, an intermediate sealing sheath 24, a pair of cross wound tensile armor layers 27a, 27b, and an outer liquid pervious protection layer 21 in the form of an extruded polymer layer with perforations 21a. The respective layers can e.g. be as above. The inner sealing sheath 23 and the intermediate sealing sheath 24 form an annulus in which the pressure armor layer 25 and the drainage layer 26 are arranged. The pressure armor layer 25 comprises not shown pressure armor gaps between windings as explained above and the drainage layer 26 comprises at least one not shown drainage path in fluid communication with the pressure armor gaps and arranged along the length of the pipe. The drainage layer 26 is arranged closer to the inner sealing sheath 23 than the pressure armor layer 25, i.e. the drainage layer 26 is arranged below the pressure armor layer 25, and advantageously the polymer panel structure of the drainage layer 26 has a relatively low thermal conductivity and thereby simultaneously provides a thermal insulation of the pipe.

Figure 4:
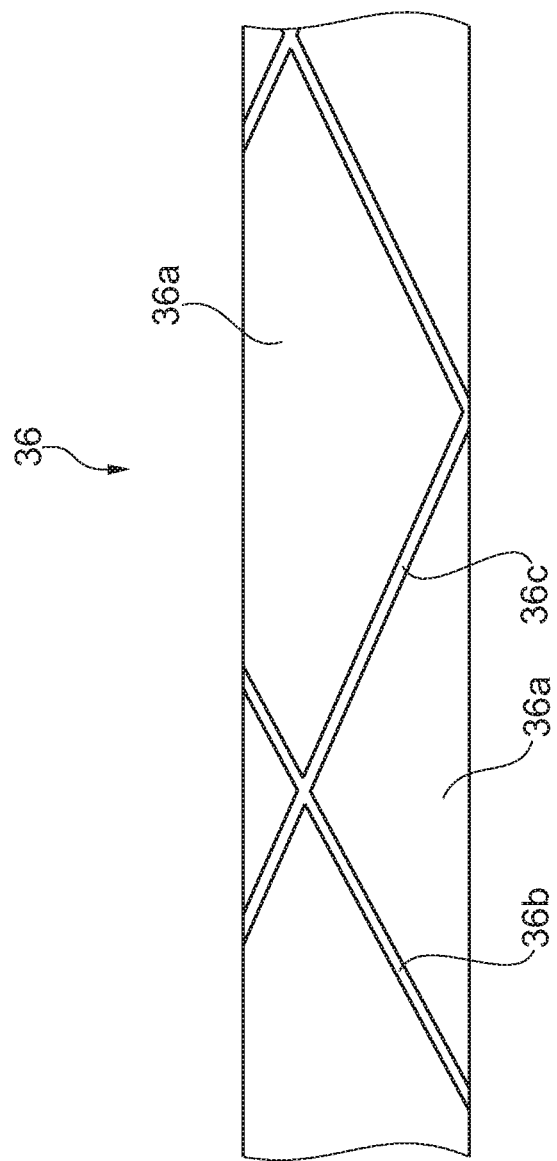
FIG. 4 is a schematic side view of a drainage layer of an unbonded flexible pipe of the invention.

FIG. 4 shows a drainage layer 36 of an unbonded flexible pipe of the invention. The drainage layer 36 comprises a polymer panel structure with a plurality of panel sections 36a framing two drainage paths 36b, 36c. Each of the two drainage paths 36b, 36c has a helical configuration along the length of the pipe with opposite coiling directions such that they cross each other. The two drainage paths 36b, 36c are formed by distances between the panel sections 36a. The distances between the panel sections 36a can be adjusted by not shown distance elements, such as I-profiled or Π-profiled elements.

Figure 5:
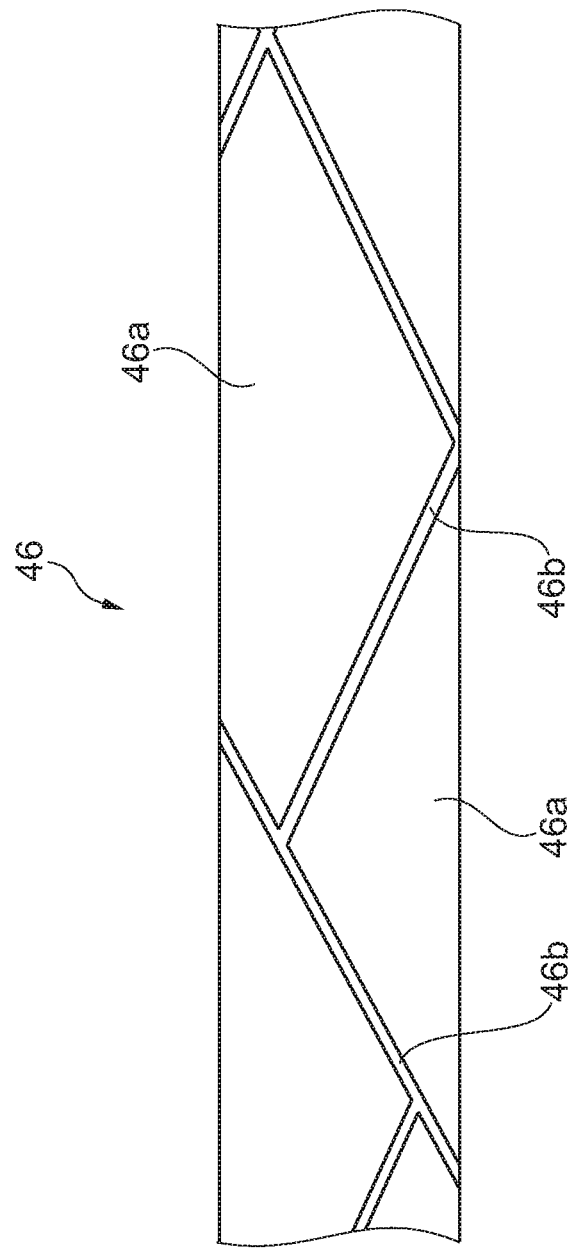
FIG. 5 is a schematic side view of another drainage layer of an unbonded flexible pipe of the invention.
Figure 6:
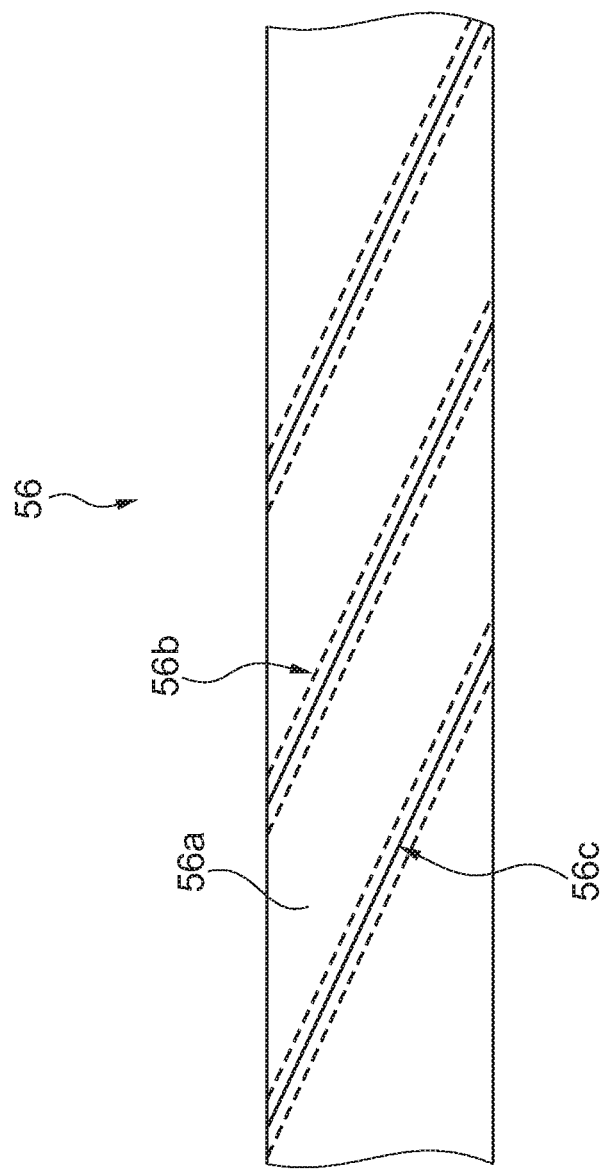
FIG. 6 is a schematic side view of yet another drainage layer of an unbonded flexible pipe of the invention.

FIG. 5 shows a drainage layer 46 of an unbonded flexible pipe of the invention. The drainage layer 46 comprises a polymer panel structure with a plurality of panel sections 46a framing sections of drainage paths 46b forming a non-helically configuration. The drainage paths 46b are formed by distances between the panel sections 46a.

FIG. 5 shows a drainage layer 56 of an unbonded flexible pipe of the invention. The drainage layer 56 comprises a helically wound polymer panel structure 56a wound with a helical gap 56b between windings thereof. In the helical gap 56b is arranged a perforated tube 56c forming a drainage path along the length of the pipe. The diameter determined in radial direction of the perforated tube 56c is advantageously not larger than the radially determined thickness of the helically wound polymer panel structure 56a, such that the perforated tube 56c can be arranged fully in the helical gap 56b without protruding there from. Preferably the diameter determined in radial direction of the perforated tube 56c is substantially identical to the radially determined thickness of the helically wound polymer panel structure 56a.

Figure 7:
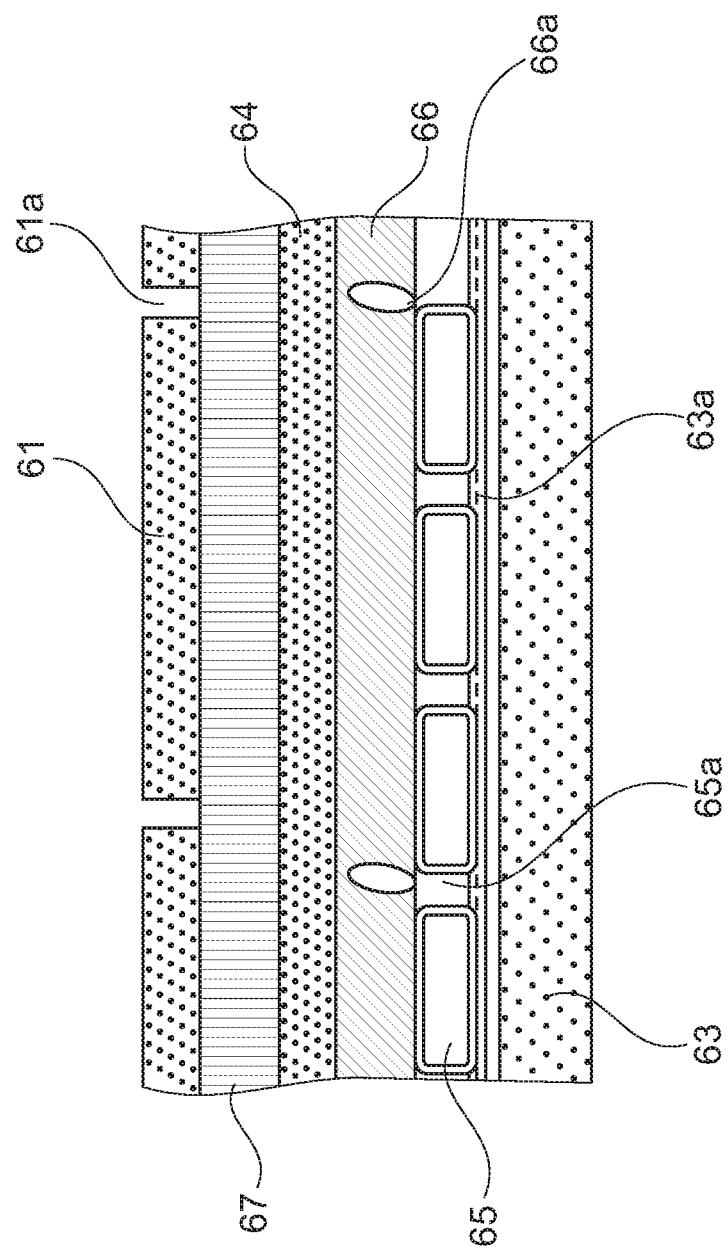
FIG. 7 is a schematic illustration of a wall section of an unbonded flexible pipe of the invention.

FIG. 7 shows a wall section of an unbonded flexible pipe of the invention comprising from inside (from the bore) and out an inner sealing sheath 63, an anti-wear layer 63a, a pressure armor layer 65, a drainage layer 66, an intermediate sealing sheath 64, a tensile armor 67 e.g. of not shown cross wound tensile armor layers, and a liquid pervious protection layer 61 in the form of a polymer layer with perforations 61a. The respective layers can e.g. be as described above.

The unbonded flexible pipe can additionally advantageously comprise a not shown carcass on the inner side of the inner sealing sheath 63.

The anti-wear layer 63a is pervious and is provided in order to protect the inner sealing sheath 63 against undesired depressions from the pressure armor layer 65.

The pressure armor layer 65 comprises at least one elongate metal element arranged with pressure armor gaps 65a, which in the show embodiment are relatively large, whereas in practice the pressure armor layer will be rather compact and the gaps 65a will usually be relatively small.

The drainage layer 66 comprises partly embedded drainage paths in the form of perforated tubes 66a, where the not shown perforations of the perforated tube 66a are arranged such that they face the pressure armor layer 65 such that the drainage paths via the perforations of the perforated tube 66a are in fluid communication with the pressure armor gaps 65a.

Figure 8:
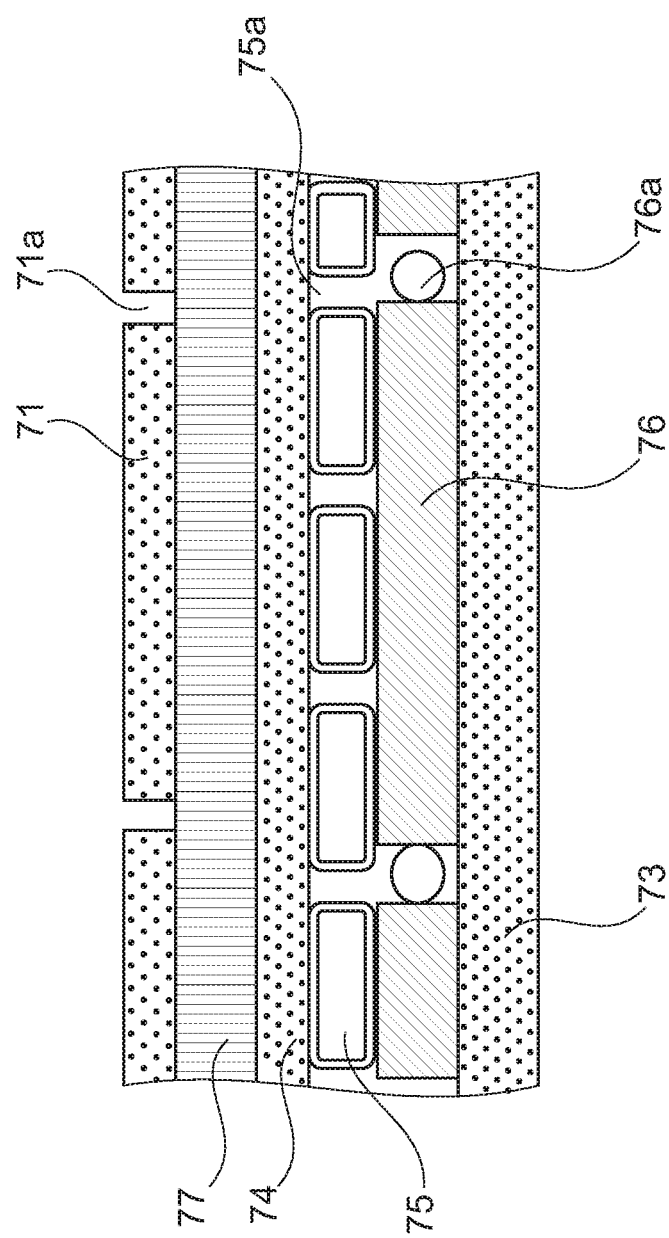
FIG. 8 is a schematic illustration of a wall section of another unbonded flexible pipe of the invention.

FIG. 8 shows a wall section of another unbonded flexible pipe of the invention comprising from inside (from the bore) and out an inner sealing sheath 73, a drainage layer 76, a pressure armor layer 75, an intermediate sealing sheath 74, a tensile armor 77 e.g. of not shown cross wound tensile armor layers, and a liquid pervious protection layer 71 in the form of a polymer layer with perforations 71a. The respective layers can e.g. be as described above.

Since the drainage layer 76 is applied between the inner sealing sheath 73 and the pressure armor layer 75, there is no need for applying an anti-wear layer above the inner sealing sheath 73. The surface of the drainage layer 76 which is in direct contact with the inner sealing sheath 73 is advantageously essentially smooth for protecting the inner sealing sheath 73.

The unbonded flexible pipe can additionally advantageously comprise a not shown carcass on the inner side of the inner sealing sheath 73.

The pressure armor layer 75 comprises at least one elongate metal element arranged with pressure armor gaps 75a.

The drainage layer 76 comprises a polymer panel structure which is applied with gaps 76b comprising drainage paths in the form of perforated tubes 76a arranged therein. The perforated tubes 76a comprise not shown perforations such that the drainage paths via the perforations of the perforated tube 76a are in fluid communication with the pressure armor gaps 75a.

Figure 9:
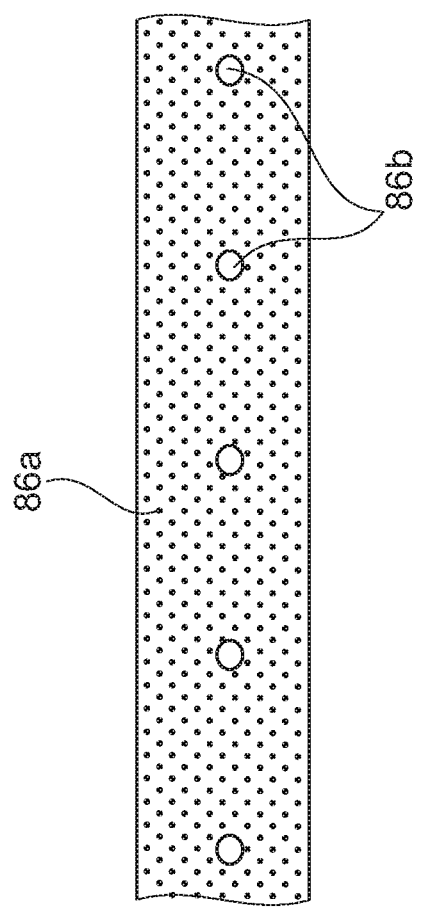
FIG. 9 is a schematic illustration of a perforated tube providing a drainage path in an unbonded flexible pipe of the invention, wherein the perforated tube comprises perforations arranged in line.

FIG. 9 shows a section of a perforated tube 86a providing a drainage path in an unbonded flexible pipe of the invention, wherein the perforated tube comprises perforations 86b arranged in line.

Figure 10:
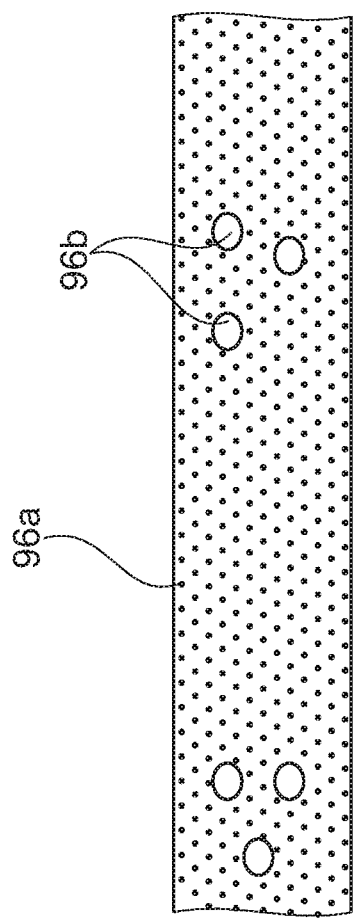
FIG. 10 is a schematic illustration of another perforated tube providing a drainage path in an unbonded flexible pipe of the invention, wherein the perforated tube comprises clusters of perforations.

FIG. 10 shows a section of a perforated tube 96a providing a drainage path in an unbonded flexible pipe of the invention, wherein the perforated tube comprises perforations 96b arranged in clusters.

Figure 11:
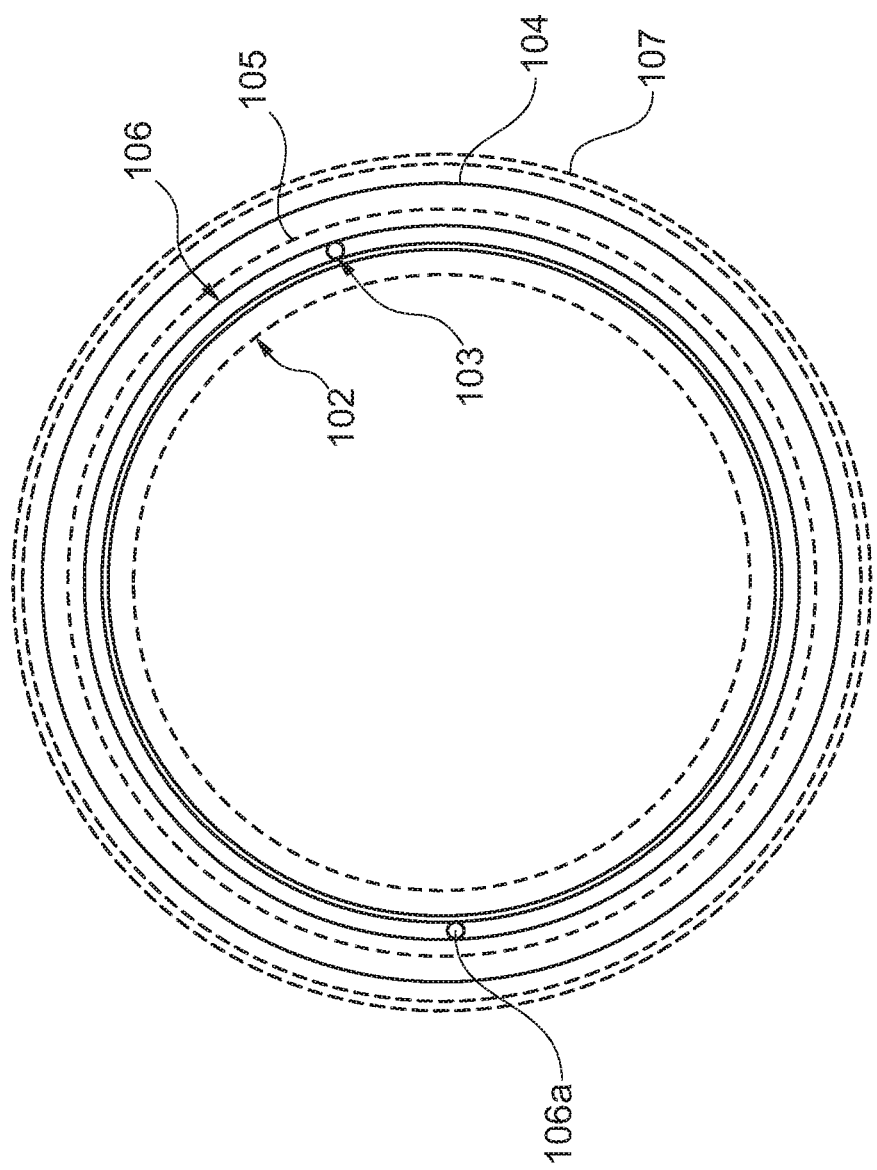
FIG. 11 is a schematic illustration of a cross-sectional view of an unbonded flexible pipe of the invention, wherein the drainage path is provided by perforated tubes arranged in a drainage layer comprising a polymer panel structure.

FIG. 11 shows an unbonded flexible pipe of the invention comprising from inside and out a carcass 102, an inner sealing sheath 103, a drainage layer 106, a pressure armor layer 105, an intermediate sealing sheath 104 and a tensile armor 107 e.g. of not shown cross wound tensile armor layers. The respective layers can e.g. be as described above.

The inner sealing sheath 103 and the intermediate sealing sheath 104 form an annulus comprising the pressure armor layer 105 and the drainage layer 106. The pressure armor layer 105 comprises a not shown elongate metal element arranged with not shown pressure armor gaps.

The drainage layer 106 comprises a polymer panel structure comprising drainage paths in the form of perforated tubes 106a arranged therein. The perforated tubes 106a comprise not shown perforations such that the drainage paths via the perforations of the perforated tube 106a are in fluid communication with the pressure armor gaps.

Figure 12:
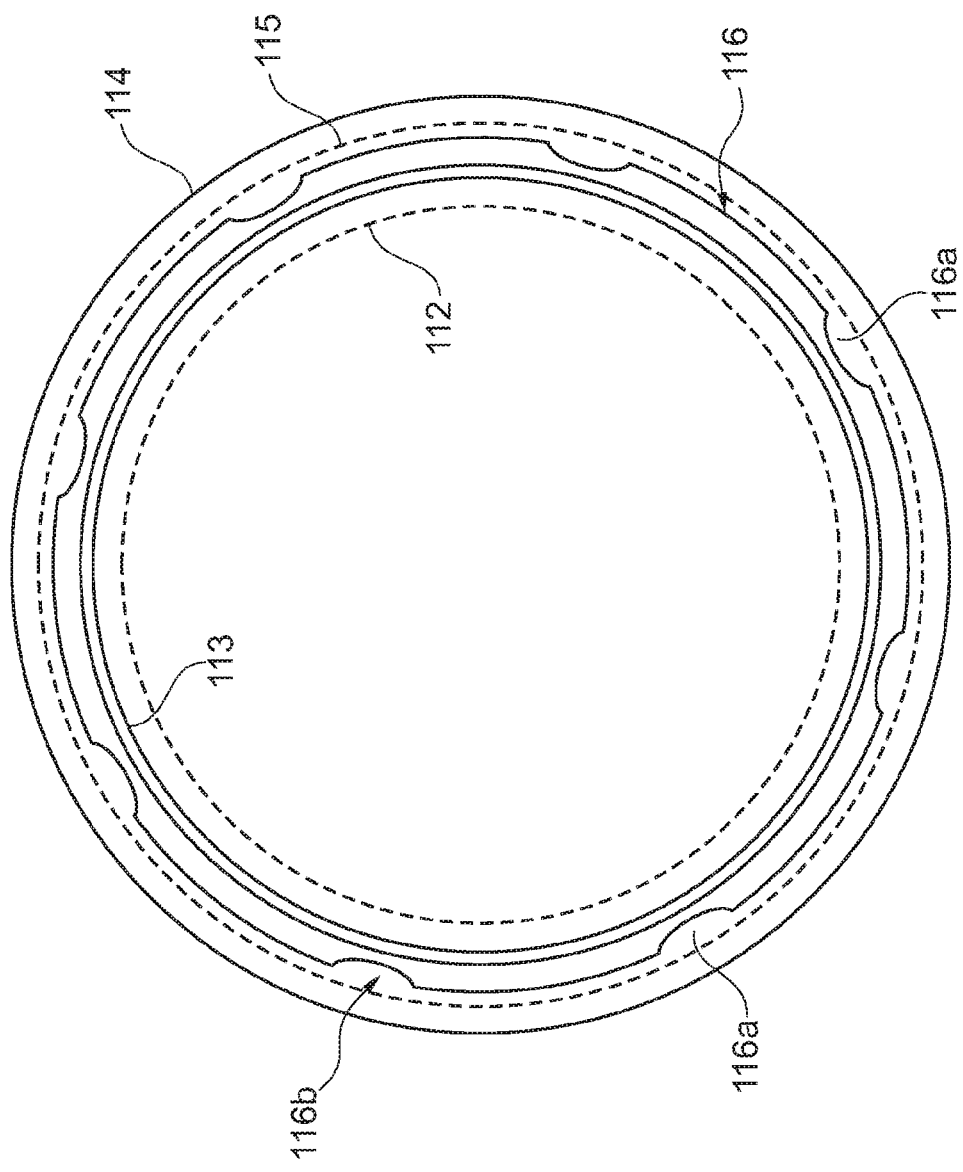
FIG. 12 is a schematic illustration of a cross-sectional view of another unbonded flexible pipe of the invention, wherein the drainage path is provided by groove shaped channels arranged in a drainage layer comprising a polymer panel structure.

FIG. 12 shows an unbonded flexible pipe of the invention wherein the layers outside the intermediate sealing sheath 114 are not shown. The pipe comprises from inside and out a carcass 112, an inner sealing sheath 113, a drainage layer 116, a pressure armor layer 115 and an intermediate sealing sheath 114.

The inner sealing sheath 113 and the intermediate sealing sheath 114 form an annulus comprising the pressure armor layer 115 and the drainage layer 116. The pressure armor layer 115 comprises a not shown elongate metal element arranged with not shown pressure armor gaps.

The drainage layer 116 comprises a polymer panel structure comprising drainage paths 116a in the form of groove shaped channels provided in the drainage layer 116 and facing the pressure armor layer 115 such that the drainage paths 116a are in fluid communication with the pressure armor gaps. A transmitting element in form of an electrical conductor 116b is arranged in the drainage path 116a.

Figure 13:
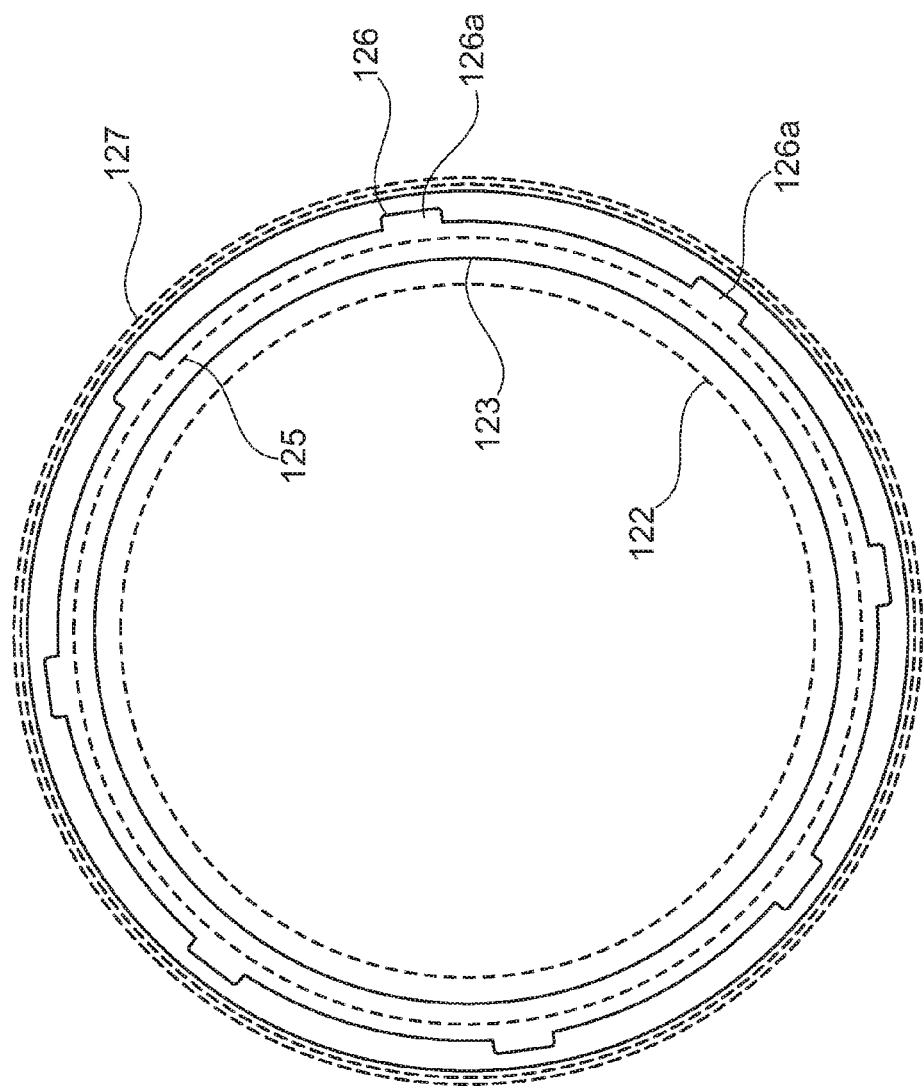
FIG. 13 is a schematic illustration of a cross-sectional view of yet another unbonded flexible pipe of the invention, wherein the drainage layer is provided by the intermediate sealing sheath.

FIG. 13 shows an unbonded flexible pipe of the invention comprising from inside and out a carcass 122, an inner sealing sheath 123, a pressure armor layer 125, a combined drainage layer and intermediate sealing sheath 126 and a tensile armor 127 e.g. of not shown cross wound tensile armor layers.

The combined drainage layer and intermediate sealing sheath 126 provide both an intermediate sealing function and drainage paths for relieving gas from the annulus.

The inner sealing sheath 123 and the combined drainage layer and intermediate sealing sheath 126 form an annulus comprising only the pressure armor layer 125. The combined drainage layer and intermediate sealing sheath 126 comprise a plurality of groove shaped channels 126a on the inner side thereof facing the pressure armor layer 125. The groove shaped channels 126a form drainage paths in fluid communication with not shown pressure armor gaps.

Some preferred embodiments have been shown in the foregoing, but it should be stressed that the invention is not limited to these, but may be embodied in other ways within the subject-matter defined in the following claims.

What is claimed is:

1. A unbonded flexible pipe having a length and a longitudinal axis and comprising an inner sealing sheath defining a bore, a pressure armor layer, an intermediate sealing sheath and a tensile armor, wherein the pressure armor layer comprises at least one elongate metal element arranged with pressure armor gaps and is arranged in an annulus provided between said inner sealing sheath and said intermediate sealing sheath, said tensile armor being arranged on the outer side of said intermediate sealing sheath, wherein said intermediate sealing sheath forms a drainage layer or said unbonded flexible pipe further comprises a drainage layer arranged in said annulus, said drainage layer comprises at least one drainage path arranged along the length of the pipe, wherein the drainage path is in fluid communication with said pressure armor gaps and wherein said drainage path is in the form of a perforated tube comprising a plurality of perforations.

2. The unbonded flexible pipe of claim 1, wherein said intermediate sealing sheath forms the drainage layer, the intermediate sheath comprises at least one groove shaped channel on the inner side thereof facing the pressure armor layer, and the perforated tube arranged in the groove shaped channel forms the drainage path.

3. The unbonded flexible pipe of claim 1, wherein said drainage layer is arranged in said annulus and comprises said at least one drainage path and a polymer panel structure framing said at least one drainage path.

4. The unbonded flexible pipe of claim 1, wherein said perforated tube comprises a plurality of perforations facing towards the pressure armor layer.

5. The unbonded flexible pipe of claim 3, wherein said polymer panel structure and said perforated tube are not bonded to each other.

6. The unbonded flexible pipe of claim 3, wherein said polymer panel structure provides a grove shaped crib for said perforated tube, preferably such that the tube is facing towards the pressure armor layer.

7. The unbonded flexible pipe of claim 3, wherein said perforated tube has an outer radial diameter determined in radial direction and said drainage layer has a thickness determined in radial direction, wherein said thickness of said drainage layer is up to about 5 times the outer radial diameter of said perforated tube.

8. The unbonded flexible pipe of claim 3, wherein said perforated tube has an outer radial diameter determined in radial direction and said drainage layer has a thickness determined in radial direction, wherein said thickness of said drainage layer is at least about 1.1 times the outer radial diameter of said perforated tube, wherein said panel structure provides a grove shaped crib for said perforated tube, such that the tube is facing towards the pressure armor layer.

9. The unbonded flexible pipe of claim 8, wherein said panel structure provides a thermal insulation, the panel structure exhibits a thermal conductivity of about 0.3 W/m·K or less.

10. The unbonded flexible pipe of claim 1, wherein said perforated tube has an outer radial diameter determined in radial direction and said drainage layer has a thickness determined in radial direction, wherein said thickness of said drainage layer is at least about 75% the outer radial diameter of said perforated tube.

11. The unbonded flexible pipe of claim 1, wherein said drainage layer comprises a plurality of perforated tubes.

12. The unbonded flexible pipe of claim 1, wherein said drainage path is arranged to be substantially parallel with the longitudinal axis of the pipe.

13. The unbonded flexible pipe of claim 1, wherein said drainage path is arranged to extend helically along the length of the pipe.

14. The unbonded flexible pipe of claim 1, wherein said drainage layer comprises a signal transmitting element.

15. The unbonded flexible pipe of claim 3, wherein said polymer panel structure is of a material having an elastic modulus E≥1.5 GPa.

16. The unbonded flexible pipe of claim 3, wherein said polymer panel structure has a compression stiffness in axial direction of the pipe of at least about 1 GPa/m.

17. The unbonded flexible pipe of claim 3, wherein said polymer panel structure comprises reinforcement element(s) such as fibers, solid and/or hollow microspheres, e.g. made from glass, polymer or silica, preferably the polymer panel structure comprises fibres, such as glass fibres, carbon fibres, aramide fibres, silica fibres such as basalt fibres, steel fibres, polyethylene fibres, polypropylene fibres, mineral fibres, and/or any combination thereof.

18. The unbonded flexible pipe of claim 3, wherein said polymer panel structure comprises syntactic foam.

19. The unbonded flexible pipe of claim 1, wherein said drainage layer is arranged above the pressure armor layer.

20. The unbonded flexible pipe of any one of claim 1, wherein said drainage layer is arranged below the pressure armor layer.

21. The unbonded flexible pipe of claim 1, wherein said pressure armor layer comprises at least one elongate metal wire which is helically wound and optionally interlocked in adjacent windings, preferably the at least one elongate metal wire is wound with a winding angle to the longitudinal axis of the core part of the pipe which is at least about 55 degrees, preferably at least about 70 degrees, such as at least about 80 degrees.

22. The unbonded flexible pipe of claim 1, wherein said unbonded flexible pipe comprises a carcass arranged inside said inner sealing sheath.

23. The unbonded flexible pipe of claim 1, wherein said tensile armor comprises at least two cross-wound tensile armor layers, each tensile armor layer comprises a plurality of helically wound elongate armor elements and said tensile armor comprises or consists essentially of composite material and said unbonded flexible pipe comprises an outer protection layer, said outer protection layer is liquid permeable.

* * * * *